United States Patent
Matsumoto et al.

(10) Patent No.: US 9,217,381 B2
(45) Date of Patent: Dec. 22, 2015

(54) HYBRID VEHICLE AND CONTROL METHOD OF HYBRID VEHICLE

(75) Inventors: Takashi Matsumoto, Okazaki (JP); Daigo Ando, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 107 days.

(21) Appl. No.: 14/241,136

(22) PCT Filed: Aug. 31, 2011

(86) PCT No.: PCT/JP2011/069716
§ 371 (c)(1),
(2), (4) Date: Feb. 26, 2014

(87) PCT Pub. No.: WO2013/030971
PCT Pub. Date: Mar. 7, 2013

(65) Prior Publication Data
US 2014/0229088 A1   Aug. 14, 2014

(51) Int. Cl.
| | |
|---|---|
| *F02D 29/06* | (2006.01) |
| *F02D 29/02* | (2006.01) |
| *B60K 6/445* | (2007.10) |
| *B60W 10/06* | (2006.01) |
| *B60W 10/08* | (2006.01) |
| *B60W 20/00* | (2006.01) |
| *F02N 11/08* | (2006.01) |
| *F02P 5/15* | (2006.01) |

(52) U.S. Cl.
CPC ............... *F02D 29/02* (2013.01); *B60K 6/445* (2013.01); *B60W 10/06* (2013.01); *B60W 10/08* (2013.01); *B60W 20/00* (2013.01); *B60W 20/40* (2013.01); *F02N 11/0814* (2013.01); *F02P 5/1506* (2013.01); *B60Y 2300/436* (2013.01); *F02D 29/06* (2013.01); *Y02T 10/46* (2013.01); *Y02T 10/48* (2013.01); *Y02T 10/6239* (2013.01); *Y02T 10/6286* (2013.01)

(58) Field of Classification Search
CPC ...................................................... F02D 29/06
USPC ............. 123/406.11, 406.12, 406.53, 406.54, 123/179.4; 701/112, 113
See application file for complete search history.

(56) References Cited

U.S. PATENT DOCUMENTS

| | | | |
|---|---|---|---|
| 6,189,317 B1 * | 2/2001 | Yasui et al. | 60/284 |
| 7,751,965 B2 * | 7/2010 | Ando et al. | 701/113 |
| 8,146,556 B2 * | 4/2012 | Yoshikawa et al. | 123/179.16 |
| 8,909,400 B2 * | 12/2014 | Sato et al. | 701/22 |
| 2003/0041831 A1 | 3/2003 | Aoki et al. | |
| 2005/0145217 A1 * | 7/2005 | Takama et al. | 123/339.11 |
| 2006/0048734 A1 * | 3/2006 | Kataoka et al. | 123/179.4 |
| 2010/0152938 A1 | 6/2010 | Aoki et al. | |

(Continued)

FOREIGN PATENT DOCUMENTS

| | | |
|---|---|---|
| CN | 102155320 A | 8/2011 |
| JP | 2003-065105 A | 3/2003 |

(Continued)

*Primary Examiner* — Thomas Moulis
(74) *Attorney, Agent, or Firm* — Kenyon & Kenyon LLP (57) ABSTRACT

A hybrid vehicle includes an engine, a motor generator configured to control the revolution speed of the engine, and an ECU configured to control ignition timing of the engine. The ECU modifies, in the case where the revolution speed of the engine is not controlled by the motor generator, the ignition timing for startup of the engine to a further timing retarding side, as compared to the case where the revolution speed of the engine is controlled by the motor generator.

16 Claims, 7 Drawing Sheets

(56) References Cited

U.S. PATENT DOCUMENTS

| | | |
|---|---|---|
| 2010/0228461 A1 | 9/2010 | Sugai et al. |
| 2011/0180043 A1 | 7/2011 | Falkowski et al. |
| 2014/0229088 A1 | 8/2014 | Matsumoto et al. |

FOREIGN PATENT DOCUMENTS

| | | |
|---|---|---|
| JP | 2003-214308 A | 7/2003 |
| JP | 2004-092428 A | 3/2004 |
| JP | 2007-182179 A | 7/2007 |
| JP | 2008-284909 A | 11/2008 |
| JP | 2009-061869 A | 3/2009 |
| JP | 2009-095161 A | 4/2009 |
| JP | 2010-012902 A | 1/2010 |
| WO | 2013/030971 A1 | 3/2013 |

\* cited by examiner

HYBRID VEHICLE AND CONTROL METHOD OF HYBRID VEHICLE

CROSS-REFERENCE TO RELATED APPLICATIONS

This is a national phase application based on the PCT International Patent Application No. PCT/JP2011/069716 filed on Aug. 31, 2011, the entire contents of which are incorporated herein by reference.

TECHNICAL FIELD

The present invention relates to a hybrid vehicle and a control method of a hybrid vehicle, more particularly to engine startup control of a hybrid vehicle.

BACKGROUND ART

As an environment-friendly vehicle in recent years, attention is focused on a vehicle that has a power storage device (for example, a secondary battery, capacitor, or the like) mounted and that travels using the driving power generated from the electric power stored in the power storage device. Such a vehicle includes, for example, an electric vehicle, a hybrid vehicle, a fuel cell vehicle, and the like. The technique of charging such a power storage device mounted on such vehicles by a commercial power supply of high power generation is proposed.

Among such vehicles, a hybrid vehicle runs using the driving power generated by a rotating electric machine using electric power stored in a power storage device, and the driving power generated by an internal combustion engine (for example, an engine). The hybrid vehicle may be capable of stopping the engine during idling, and running with the engine stopped, using only the driving power generated by a rotating electric machine, such as an electric vehicle. In this case, the restarting condition of the engine must be set appropriately in order to suppress degradation in fuel efficiency.

Japanese Patent Laying-Open No. 2009-061869 (PTD 1) discloses a hybrid vehicle including an engine and a motor, configured to mask the knocking determination result for a predetermined time from the initiation of engine startup, when starting the engine by the operation of the motor, to control the engine with ignition timing according to the operating state of whether the engine has arrived at full combustion or not, and to control the engine with ignition timing according to the engine operating state and knocking determination result at an elapse of a predetermined time from the initiation of engine startup.

CITATION LIST

Patent Document

PTD 1: Japanese Patent Laying-Open No. 2009-061869
PTD 2: Japanese Patent Laying-Open No. 2008-284909
PTD 3: Japanese Patent Laying-Open No. 2009-095161
PTD 4: Japanese Patent Laying-Open No. 2010-012902

SUMMARY OF INVENTION

Technical Problem

In a hybrid vehicle, the engine and the rotating electric machine are controlled cooperatively to output the traction driving power. The revolution speed of the engine may be controlled by the rotating electric machine.

Some hybrid vehicles may have the engine stopped and restarted during running or during suspension according to the required torque by the user and/or the state of charge (SOC) of the power storage device. At the time of restarting the engine, the load on the engine may vary depending on whether the revolution speed of the engine is controlled or not by the rotating electric machine. Accordingly, there is a possibility of the engine revolution speed being suddenly increased since the load is low when the revolution speed of the engine is not controlled.

In contrast, when the starting condition such as the ignition timing is set so as to suppress sudden increase of the revolution speed in a low load state, there is a possibility of knocking or the like occurring due to insufficient torque of the engine in the event of the load being relatively high by the engine revolution control through the rotating electric machine.

Thus, the fuel efficiency may be degraded due to the unrequired increase in the rotation of the engine, and/or the driverability may be degraded due to increase of the engine noise and vibration.

In view of the foregoing, an object of the present invention is to suppress degradation in the running performance caused by engine load variation at the time of engine startup in a hybrid vehicle.

Solution to Problem

A hybrid vehicle according to the present invention includes an engine, a rotating electric machine capable of controlling the revolution speed of the engine, and a control device configured to control the ignition timing of the engine. The control device modifies the ignition timing for startup of the engine depending on whether the revolution speed of the engine is controlled by the rotating electric machine.

Preferably, in the case where when the revolution speed of the engine is not controlled by the rotating electric machine, the control device sets the ignition timing for startup of the engine at a further timing retarding side as compared to the case where the revolution speed of the engine is controlled by the rotating electric machine.

Preferably, the control device continues to set for a predetermined time, for startup of the engine, the ignition timing of the engine at a predetermined timing retarding amount, and then restores the ignition timing in a timing advancing direction at a predetermined restoring rate to the ignition timing of a steady operation of the engine. The control device modifies the predetermined time depending on whether or not the revolution speed of the engine is controlled by the rotating electric machine.

Preferably, in the case where the revolution speed of the engine is not controlled by the rotating electric machine, the control device sets the predetermined time longer as compared to the case where the revolution speed of the engine is controlled by the rotating electric machine.

Preferably, in the case where the revolution speed of the engine is not controlled by the rotating electric machine, the control device restores the ignition timing more slowly to the ignition timing of a steady operation by setting the predetermined restoring rate lower, in addition to setting the predetermined time longer.

Preferably, the control device continues to set for a predetermined time, for startup of the engine, the ignition timing of the engine at a predetermined timing retarding amount, and then restores the ignition timing in a timing advancing direction at a predetermined restoring rate to the ignition timing of a steady operation of the engine. The control device modifies the predetermined restoring rate depending on whether or not the revolution speed of the engine is controlled by the rotating electric machine.

Preferably, in the case where the revolution speed of the engine is not controlled by the rotating electric machine, the control device restores the ignition timing more slowly to the ignition timing of a steady operation by setting the predetermined restoring rate low, as compared to the case where the revolution speed of the engine is controlled by the rotating electric machine.

Preferably, the hybrid vehicle further includes a power storage device capable of being charged by electric power generated by the rotating electric machine. In the case where the revolution speed of the engine is controlled by the rotating electric machine, the rotating electric machine generates power by an operation of the engine. In the case where the revolution speed of the engine is controlled by the rotating electric machine, the control device modifies a timing retarding level of the ignition timing for startup of the engine based on a state of charge of the power storage device.

Preferably, an upper limit of electric power to be charged to the power storage device is determined according to the amount of electric power remaining in the power storage device. The control device sets the timing retarding level of the ignition timing for startup of the engine greater as the charging electric power upper limit to the power storage device becomes smaller.

A hybrid vehicle of the present invention includes a power storage device, an engine, a first rotating electric machine capable of controlling the revolution speed of the engine, a second rotating electric machine generating traction driving power using electric power from the power storage device, and a control device configured to control the ignition timing of the engine. The control device modifies the ignition timing for startup of the engine depending on whether or not the revolution speed of the engine is controlled by the first rotating electric machine.

A control method of a hybrid vehicle according to the present invention is directed to a method of controlling a hybrid vehicle including an engine and a rotating electric machine capable of controlling the revolution speed of the engine. The control method includes the steps of determining whether or not the revolution speed of the engine is controlled by the rotating electric machine, and modifying the ignition timing for startup of the engine according to a determination result by the determining step.

Advantageous Effects of Invention

According to the present invention, degradation in the running performance caused by engine load variation at engine startup can be suppressed in a hybrid vehicle.

DESCRIPTION OF EMBODIMENTS

Embodiments of the present invention will be described in detail hereinafter with reference to the drawings. In the drawings, the same or corresponding elements have the same reference characters allotted, and description thereof will not be repeated.

Figure 1:
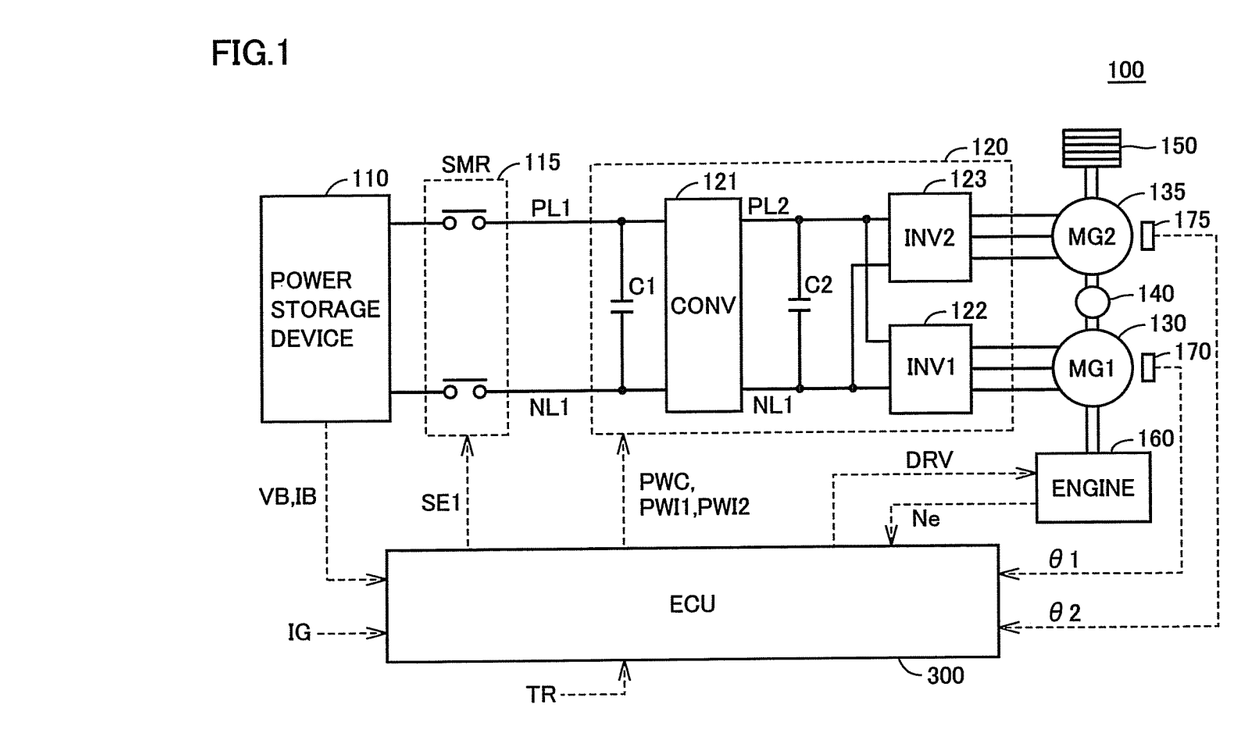
FIG. 1 is an entire block diagram of a hybrid vehicle according to an embodiment.

FIG. 1 is an entire block diagram of a hybrid vehicle 100 according to an embodiment. Referring to FIG. 1, vehicle 100 includes a power storage device 110, a system main relay (SMR) 115, a PCU (Power Control Unit) 120 that is a driving device, motor generators 130 and 135, a power transmission gear 140, a driving wheel 150, an engine 160 qualified as an internal combustion engine, and an ECU (Electronic Control Unit) 300 qualified as a control device. PCU 120 includes a converter 121, inverters 122 and 123, and capacitors C1 and C2.

Power storage device 110 is a power storing component configured to allow charging and discharging. Power storage device 110 is configured including a secondary battery such as a lithium ion battery, nickel-metal hydride battery, or lead-acid battery, or a power storage element such as an electric double layer capacitor.

Power storage device 110 is connected to converter 121 of PCU 120 via power lines PL1 and NL1. Power storage device 110 supplies electric power to PCU 120 for generating the driving power of vehicle 100. Power storage device 110 stores the electric power generated at motor generators 130 and 135. Power storage device 110 provides an output of approximately 200V, for example.

SMR 115 includes a relay having one connected to the positive terminal of power storage device 110 and the other end connected to power line PL1, and another relay having one end connected to the negative terminal of power storage device 110 and the other end connected to power line NL1. SMR 115 switches between supply and cut off of electric power between power storage device 110 and PCU 120 based on a control signal SE1 from ECU 300.

Converter 121 carries out voltage conversion between power lines PL1 and NL1 and power lines PL2 and NL1 based on a control signal PWC from ECU 300.

Inverters 122 and 123 are connected parallel to power lines PL2 and NL1. Inverters 122 and 123 are controlled by control signals PWI1 and PWI2 from ECU 300 to convert DC power supplied from converter 121 into AC power to drive motor generators 130 and 135, respectively.

Capacitor C1 is provided between power lines PL1 and NL1 to reduce the voltage variation between power lines PL1 and NL1. Capacitor C2 is provided between power lines PL2 and NL1 to reduce the voltage variation between power lines PL2 and NL1.

Motor generators 130 and 135 are AC rotating electric machines, for example, a permanent magnet type synchronous electric motor including a rotor in which a permanent magnet is embedded. In the following description, motor generator 130 and motor generator 135 are also referred to as "MG1" and "MG2", respectively.

The output torque from motor generators 130 and 135 is transmitted to driving wheel 150 via power transmission gear 140 configured including a power split mechanism typically represented by a speed reducer and a planetary gear to cause vehicle 100 to run. Motor generators 130 and 135 are also coupled to engine 160 via power transmission gear 140. By ECU 300, motor generators 130 and 135 and engine 160 are operated cooperatively to generate the required vehicle driving power. Motor generators 130 and 135 can generate power by the rotation of engine 160 or the rotation of driving wheel 150 to charge power storage device 110 using the generated electric power. In the first embodiment, it is assumed that motor generator 135 is used exclusively as an electric motor for driving driving wheel 150, and motor generator 130 is used exclusively as a power generator driven by engine 160. Motor generator 130 is used to crank up the crankshaft of engine 160 in starting engine 160.

The output axis of motor generator 130 is coupled to the sun gear of the planetary gear (not shown) in power transmission gear 140. The output axis of motor generator 135 is coupled to the ring gear of the planetary gear via the speed reducer. Also, the output axis of engine 160 is coupled to the planetary carrier of the planetary gear.

Although the configuration of FIG. 1 is based on an example where two motor generators are provided, the number of motor generators is not limited thereto as long as the configuration has a motor generator that can control the revolution speed of engine 160. A configuration in which one or more than two motor generators are provided may be employed.

Motor generators 130 and 135 are provided with degree of rotation sensors 170 and 175 to detect the degree of rotation θ1 and θ2 of motor generators 130 and 135, respectively. ECU 300 calculates the revolution speed and/or angular speed of motor generators 130 and 135 based on detected degree of rotation θ1 and θ2.

Although not shown in FIG. 1, ECU 300 includes a CPU (Central Processing Unit), a storage device, and an input/output buffer to input a signal from each sensor and output a control signal to each device, as well as to control vehicle 100 and each device. The control thereof is not limited to processing by software, and may be processed by dedicated hardware (electronic circuit).

ECU 300 obtains the SOC of power storage device 110 based on the detected values of voltage VB and current IB from the voltage sensor and current sensor (all not shown) provided for power storage device 110.

ECU 300 generates control signals PWC, PWI1 and PWI2 for converter 121 and inverters 122 and 123, and a control signal DRV for engine 160 based on the required torque TR calculated according to an operated amount of the accelerator pedal (not shown) by the user.

Moreover, ECU 300 executes the stop/restart of engine 160 according to the SOC of power storage device 110 and/or required torque TR. ECU 300 receives revolution speed Ne of engine 160 from engine 160.

ECU 300 receives a system activation signal IG applied by a user manipulation to set the vehicle in a runable state in response to system activation signal IG set ON.

Although FIG. 1 is based on a configuration in which one control device is provided as ECU 300, a configuration may be employed in which a discrete control device is provided for each function or for each device that is a target of control such as a control device for PCU 120 and/or a control device for power storage device 110.

When stopping at a red light or when running with only the driving torque from motor generator 135 in a low speed operation mode is allowed, hybrid vehicle 100 of the above-described configuration may have engine 160 stopped. Subsequently, engine 160 is restarted when running is resumed, when more torque is required, or when the SOC of power storage device 110 becomes so low that power storage device 110 must be charged by the electric power generated at motor generator 130.

Figure 2:
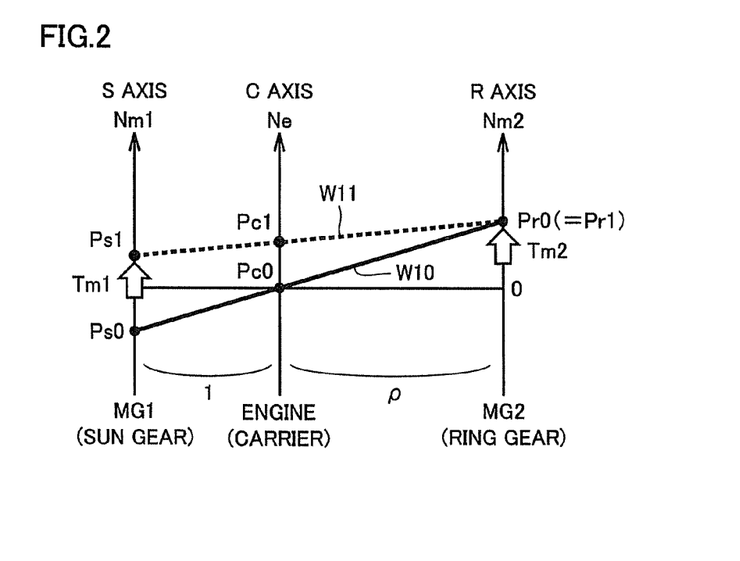
FIG. 2 is a nomographic chart to describe the relationship between the torque and revolution speed of the engine and motor generator when starting the engine.

FIG. 2 is a nomographic chart for describing the relationship between the torque and revolution speed of engine 160 and motor generators 130 and 135 when engine 160 is started.

Referring to FIGS. 1 and 2, the vertical axis in FIG. 2 represents the revolution speed of engine 160, and motor generators 130 and 135. The S axis represents revolution speed Nm1 of motor generator 130 (MG1) connected to the sun gear; the C axis represents revolution speed Ne of engine 160 connected to the planetary carrier; and the R axis represents revolution speed Nm2 of motor generator 135 (MG2) connected to the ring gear. The gear ratio of the planetary carrier to the ring gear is represented by ρ when the gear ratio of the sun gear to the planetary carrier is set at 1.

The nomographic chart when running by the traction driving power through MG2 with engine 160 stopped is represented by solid line W10 in FIG. 2. In this case, MG2 is driven such that positive torque Tm2 is output, whereby revolution speed Nm2 takes a positive value (point Pr0). Since engine 160 is stopped, revolution speed Ne of engine 160 is zero (point Pc0), whereby revolution speed Nm1 of MG1 corresponds to negative rotation (point Ps0). At this stage, torque by MG1 is not generated.

In the case where engine 160 is to be started up from the aforementioned running state, control is executed such that positive torque Tm1 is generated by MG1, whereby revolution speed Nm1 of MG1 increases to point Ps1. Accordingly, revolution speed Ne of engine 160 increases to point Pc1, whereby engine 160 is cranked up (broken line W11 in FIG. 2).

Figure 3:
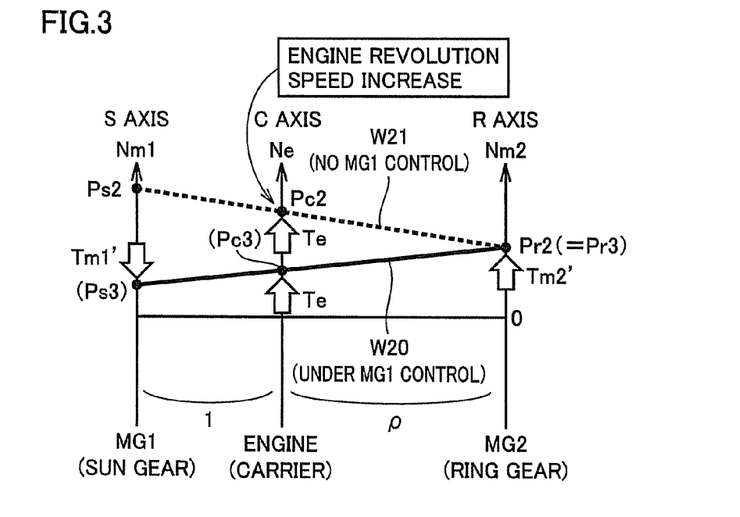
FIG. 3 is a nomographic chart to describe the change in the revolution speed of the engine and motor generator immediately after engine startup according to the presence/absence of engine revolution speed control by the motor generator.

When ignition control of engine 160 by ECU 300 is executed under a cranking state of engine 160 to start engine 160, positive torque Te is output from engine 160 as shown in FIG. 3.

In the case where the revolution speed of engine 160 is controlled by MG1 at this stage, torque Tm1' and Tm2' are output by MG1 and MG2 such that revolution speed Nm2 of MG2 does not change and revolution speed Ne of engine 160 maintains a predetermined revolution speed. Since torque Te of engine 160 and torque Tm2' of MG2 are positive torques, torque Tm1' of MG1 attains negative torque (solid line W20 in FIG. 3).

However, since torque Tm1' shown in FIG. 3 is not generated in the case where the revolution speed of engine 160 is not controlled by MG1, revolution speed Nm1 of MG1 increases to point Ps2 by torque Te of engine 160 and torque Tm2' of MG2 from the mechanical relation. Accordingly, revolution speed Ne of engine 160 increases to point Pc2.

Since there is a tendency of increase in the fuel concentration and feeding amount in the air supply pipe of engine 160 and the cylinder particularly at engine startup, great torque may be generated momentarily immediately after combustion in the cylinder. This will cause sudden increase in revolution speed Ne of engine 160, leading to degradation of the fuel efficiency and driverability due to the increase of the engine noise, or degradation of emission due to the increase of exhaust gas.

A possible measure to accommodate this sudden increase in the revolution speed of engine 160 is to retard the ignition timing of engine 160 at startup to restrict torque Te of engine 160. However when the revolution speed of engine 160 is controlled through motor generator 130 in such a case, there is a possibility of degradation of fuel efficiency and emission due to reduction in the combustion efficiency, and/or degradation of driverability due to the generation of knocking.

In the present embodiment, ignition timing control of setting variable the ignition timing of engine 160 depending on whether or not the revolution speed of engine 160 is controlled by motor generator 130, is executed at the startup of engine 160. Accordingly, sudden increase of the revolution speed when revolution control of engine 160 by motor generator 130 is not executed is prevented, and degradation in the driving performance such as the fuel efficiency, emission, and driverability can be suppressed.

Figure 4:
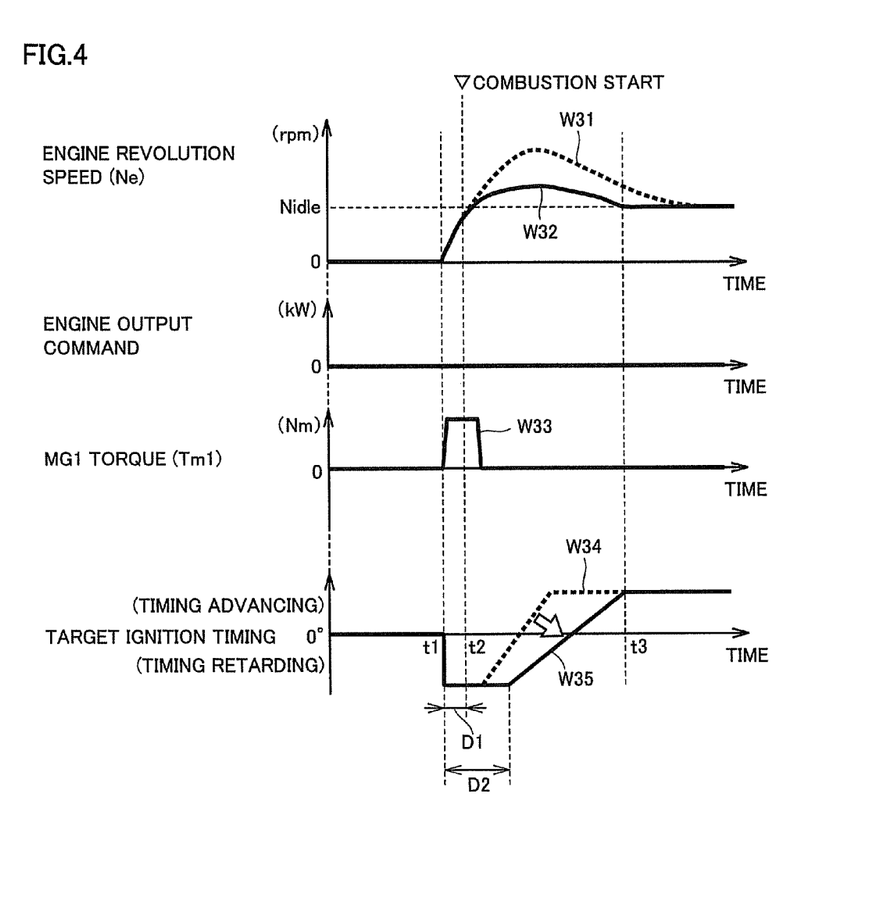
FIG. 4 is a timing chart to describe engine ignition timing control according to the present embodiment in the case where engine revolution speed control by the motor generator is not executed.
Figure 5:
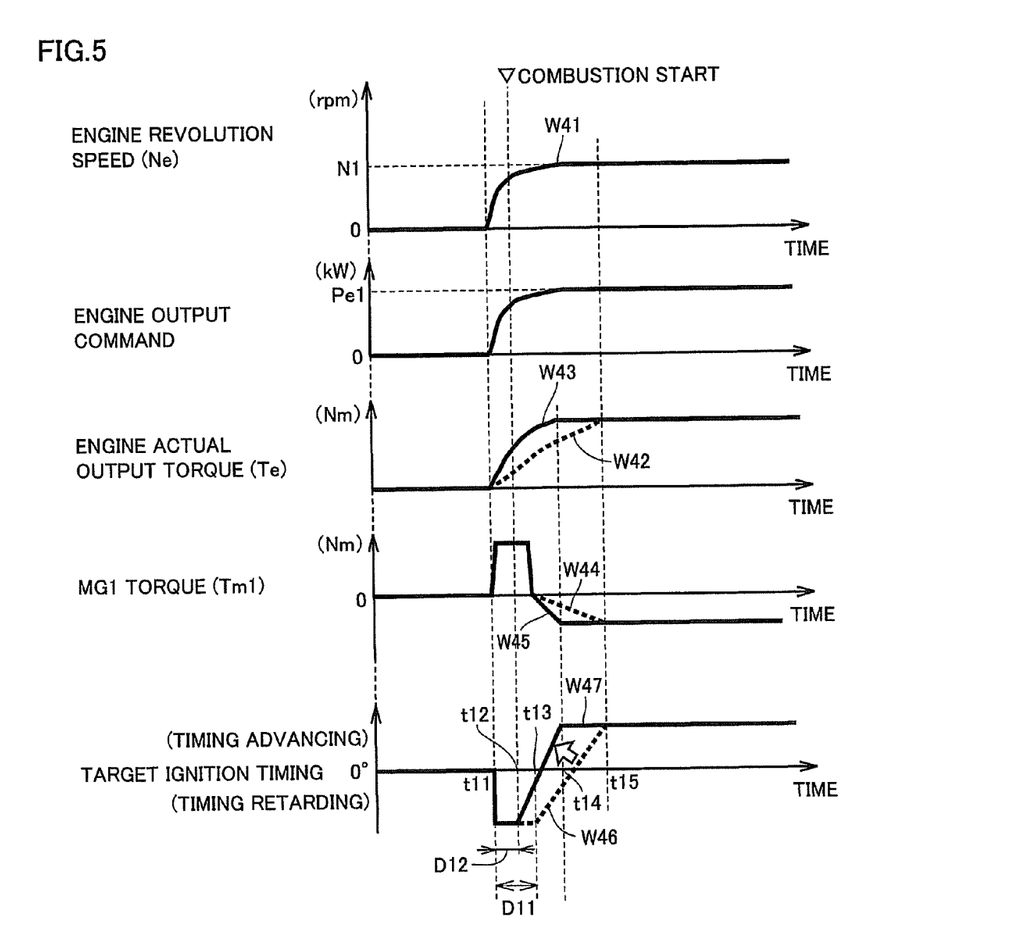
FIG. 5 is a timing chart to describe engine ignition timing control according to the present embodiment in the case where engine revolution speed control by the motor generator is executed.

Engine ignition timing control according to the present embodiment will be described schematically hereinafter with reference to FIGS. 4 and 5. FIG. 4 is a timing chart at engine startup when revolution speed control of the engine is not carried out by the motor generator. FIG. 5 is a timing chart at engine startup when revolution speed control of the engine is carried out by the motor generator.

Referring to FIGS. 1 and 4, the horizontal axis represents time, whereas the vertical axis represents engine revolution speed Ne, engine output command, MG1 torque Tm1, and engine target ignition timing. As to the ignition timing, the crank angle when the piston arrives at the top dead center is defined as 0°, where before and after arriving at the top dead center stands for a timing advancing direction and a timing retarding direction, respectively.

A state where the revolution speed of engine 160 is not controlled by motor generator (130) MG1 means that engine 160 is under a no-load state. Therefore, when engine 160 is started under such a state, the engine output command is 0 kW, such that engine 160 attains an idling operation subsequent to start up.

When an activation command of engine 160 is output at time t1, ECU 300 provides positive torque to MG1 for cranking up engine 160 (solid line W33 in FIG. 4), as described with reference to FIG. 2.

In order to ensure that the crankshaft is rotated in a predetermined rotating direction by the combustion of fuel in the cylinder when engine 160 is to be started, the ignition timing is generally set at the timing retarding side initially. When the revolution speed of engine 160 increases to a predetermined speed, combustion is initiated (time t2). Then when engine 160 initiates self-sustained operation, the cranking by MG1 is stopped, and the ignition timing is modified gradually in the timing advancing direction at a predetermined restoring rate (inclination) to the optimum ignition timing in a range where knocking does not occur (broken line W34 in FIG. 4).

The reason why the ignition timing is modified in the timing advancing direction is set forth below. Since some time is required for propagation of combustion, combustion is initiated by firing before the piston arrives at the top dead center to cause combustion to be completed when the piston begins to drop from the top dead center for the purpose of using the force originating from expansion of the burning gas as the compressive force of the piston efficiently.

Engine revolution speed Ne corresponds to speed determined by the revolution speed of MG1 during cranking by MG1, and attains a predetermined idle revolution speed Nidle when the self-sustained operation of engine 160 is initiated at time t2.

When combustion is initiated in the cylinder of engine 160 at time t2, the air supply in the cylinder is great and the fuel concentration is relatively high. Therefore, the force originating from expansion by the burning gas becomes greater as compared to that of steady operation. Since increase of revolution speed Ne at the time of initiating self-sustained operation cannot be suppressed under a no-load state where engine revolution speed control by MG1 is not effected after self-sustained operation, engine revolution speed Ne becomes greatly higher than idle revolution speed Nidle for a short period of time immediately after initiating combustion, i.e. immediately after self-sustained operation is initiated. Then, engine revolution speed Ne gradually is lowered down to idle revolution speed Nidle (broken line W31 in FIG. 4).

Accordingly, the rapid rise of revolution speed Ne may cause increase of the engine noise and/or degradation of fuel efficiency due to needless combustion. Moreover, since the ignition timing is in the midst of transition from the retarding side to the advancing side, not yet arriving at the optimum combustion point, there is a possibility of causing degradation in emission.

Further, since engine 160 is coupled to the driving shaft of driving wheel 150 by power transmission gear 140 particularly in a hybrid vehicle as shown in FIG. 1, torque shock will be transmitted via power transmission gear 140 at the time of engine startup despite engine 160 taking a non-load state. If the increase of engine revolution speed Ne is great, this torque shock may become greater.

When the engine ignition timing control of the present embodiment is applied, the ignition timing is modified in a further timing retarding direction, as compared to the case where the relevant control is not applied, as indicated by solid line W35 in FIG. 4.

Specifically, the duration of the initial timing retarding amount set at time t1 is increased from D1 to D2, and/or the restoring rate of the ignition timing subsequent to initiating self-sustained operation is reduced to restore the ignition timing in a steady operation more slowly. Alternatively, though not shown in FIG. 4, the initial timing retarding amount at time t1 may be increased to fire at the timing further in the timing retarding side.

Accordingly, the transmission efficiency of the force by the expansion of combustion gas to the piston can be reduced. As a result, the degree of increase of engine revolution speed Ne subsequent to self-sustained operation can be suppressed.

The case where engine revolution speed control by the motor generator will be described hereinafter with reference to FIG. 5. In FIG. 5, the actual output torque Te of the engine is additionally indicated in the vertical axis, in addition to the items of FIG. 4.

Referring to FIGS. 1 and 5, the event of revolution speed control of engine 160 by the motor generator includes the case where power storage device 110 is charged through power generation by motor generator 130 (MG1), the case where vehicle 100 is made to run using the traction driving power by motor generator 135 (MG2) and the traction driving power by engine 160, or the like.

Since engine 160 is operated under load in the aforementioned event, the engine output command is set at a predetermined command value Pe1.

At time t11, engine 160 is cranked up by MG1, and engine 160 initiates self-sustained operation at time t12. As described in association with FIG. 3, control is executed such that negative torque is generated at MG1 (broken line W44 in FIG. 5) subsequent to cranking. Accordingly, sudden increase in revolution speed Ne of engine 160 is suppressed. Revolution speed Ne is regulated at predetermined revolution speed N1.

In the case of the ignition timing (corresponding to broken line W34 in FIG. 4) where the control indicated by broken line W46 in FIG. 5 is not applied, the actual output Te of engine 160 gradually increases as the ignition timing is modified in the timing advancing direction to the ignition timing of normal operation, as indicated by broken line W42 in FIG. 5.

In case where revolution speed control of engine 160 is executed by the motor generator (that is, when engine 160 is operating under load) for the engine ignition timing control in the present embodiment, the sudden increase of revolution speed Ne of engine 160 is suppressed as shown in FIG. 4. Therefore, the ignition timing is modified towards the timing advancing side, opposite to that of FIG. 4, i.e. the timing retarding level is reduced as compare to the case where revolution speed control is not executed (solid line W47 in FIG. 5). Accordingly, output torque Te of engine 160 is increased in a short period of time (solid line W43 in FIG. 5).

Specifically, the duration of the initial timing retarding amount set at time t11 is shortened from D11 to D2, and/or the restoring rate of the ignition timing subsequent to initiating self-sustained operation is increased to restore the ignition timing in a steady operation more quickly. Alternatively, though not shown in FIG. 5, the initial timing retarding amount at time t11 may be decreased to fire at the timing further in the timing advancing side.

Accordingly, the engine efficiency at the time of engine startup can be improved, allowing improvement of the fuel efficiency and/or emission. Furthermore, since the engine output torque can be exhibited earlier at the time of engine startup, an operation of favorable response is allowed.

Figure 6:
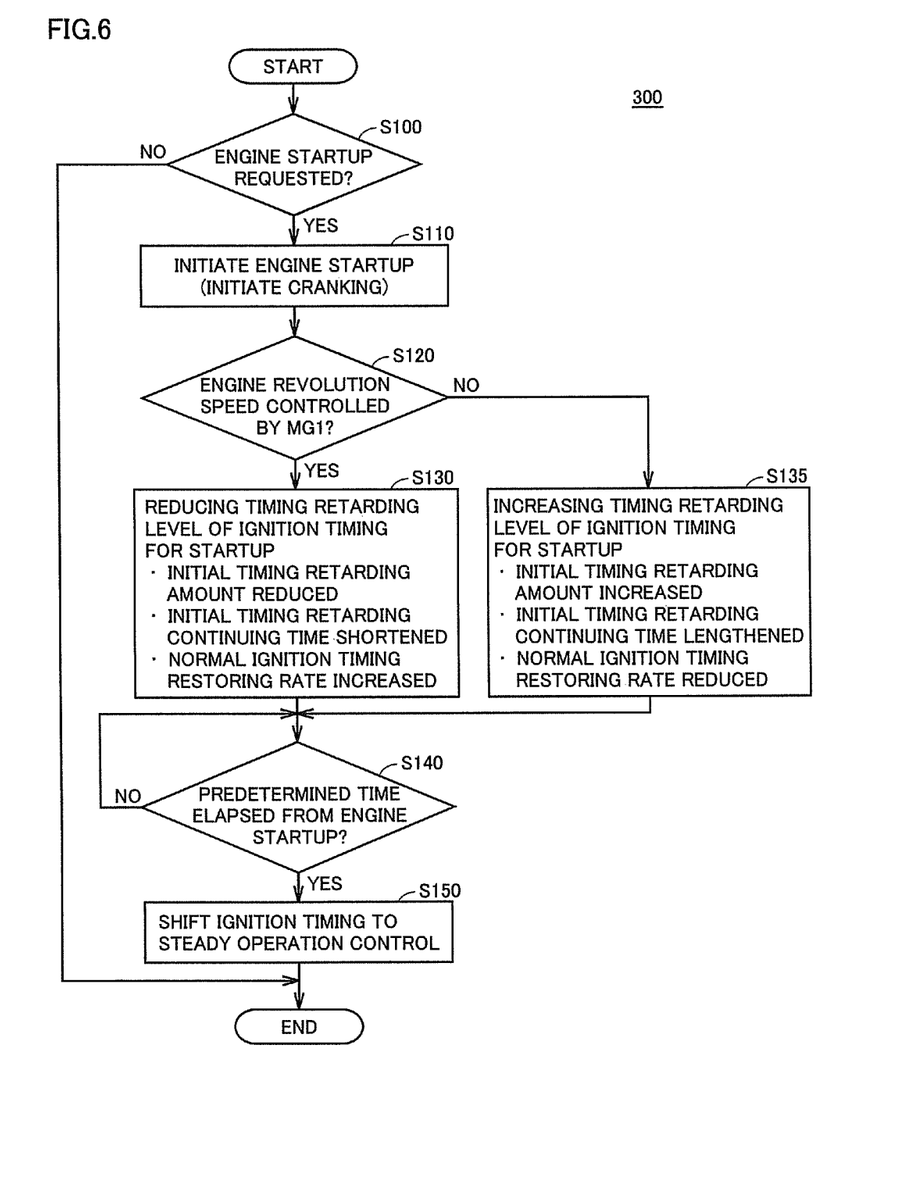
FIG. 6 is a flowchart to describe in detail an engine ignition timing control process executed at an ECU of the present embodiment.

FIG. 6 is a flowchart to describe in detail the engine ignition timing control process executed at ECU 300 according to the present embodiment. The flowchart of FIG. 6 and FIG. 7 that will be described afterwards has the process realized by invoking a prestored program in ECU 300 from the main routine and executing the program at a predetermined cycle. Alternatively, some of the steps may be developed by dedicated hardware (electronic circuit) to realize the process.

Referring to FIGS. 1 and 6, ECU 300 determines whether engine startup is requested or not at step (hereinafter, step abbreviated as S) 100.

When engine startup is not requested (NO at S100), the process of ECU 300 ends since startup of engine 160 is not required.

When engine startup is requested (YES at S100), control proceeds to S110 where ECU 300 initiates cranking of engine 160 by means of motor generator 130, and initiates ignition timing control for startup.

Then, ECU 300 determines whether revolution speed control of engine 160 is executed by motor generator 130 at S120.

When revolution speed control of engine 160 is executed (YES at S120), control proceeds to S130 where ECU 300 reduces the timing retarding level of the target ignition timing for engine startup, such that the ignition timing is shifted towards the timing advancing side as compared to the case where revolution speed control is not executed.

Specifically, as described with reference to FIG. 5, the timing retarding level of the ignition timing is reduced by any of reducing the initial timing retarding amount, shortening the duration of the initial timing retarding amount, and increasing the restoring rate to the normal ignition timing of steady operation control, or an arbitrary combination thereof. Then, control proceeds to S140.

When revolution speed control of engine 160 is not executed (NO at S120), control proceeds to S135 where ECU 300 increases the timing retarding level of the ignition timing for engine startup to attain ignition timing in the timing retarding side, as compared to the case where revolution speed control is executed.

Specifically, as described with reference to FIG. 4, any of increasing the initial timing retarding amount, increasing the duration of the initial timing retarding amount, and reducing the restoring rate to the normal ignition timing, or an arbitrary combination thereof causes the timing retarding level of ignition timing to be increased. Then, control proceeds to S140.

At S140, ECU 300 determines whether a predetermined time has elapsed from the start of a self-sustained operation of engine 160. This predetermined time is determined based on the time required for revolution speed Ne of engine 160 to arrive at a predetermined revolution speed (for example, idle revolution speed Nidle or control target revolution speed N1), and/or the time required for the ignition timing to be restored to the ignition timing of steady operation.

When a predetermined time has not elapsed (NO at S140), control returns to S140 where ECU 300 waits for the elapse of a predetermined time.

When the predetermined time has elapsed (YES at S140), control proceeds to S150 where ECU 300 causes transition to steady operation control, and drives engine 160 according to the ignition timing for steady operation.

Instead of the elapse of a predetermined time for the condition of S140, a determination may be made based on revolution speed Ne actually arriving at a predetermined revolution speed, or the ignition timing being restored to the ignition timing for steady operation.

By such control in accordance with the above-described processing, the engine can be started at appropriate ignition timing depending on whether engine revolution speed control by the motor generator is executed or not, at the time of engine startup of the hybrid vehicle. Therefore, when engine revolution speed control is not executed by the motor generator, the rapid rise of the engine revolution speed immediately after initiating a self-sustained operation of the engine can be suppressed, allowing degradation in the fuel efficiency and emission, and/or degradation in driverability such as increase in engine noise can be suppressed. Moreover, when engine revolution speed control by the motor generator is executed, the engine output is generated more rapidly to increase the engine efficiency, whereby the fuel efficiency and emission can be improved, as well as the driverability due to improvement in engine response.

[Modification]

In the case where engine is started when engine revolution speed control is executed by the motor generator, MG1 attains positive rotation and negative torque, as described with reference to FIG. 3. Therefore, electric power will be generated by the regenerative operation of MG1.

In this case, the generated electric power may partially be used for generating the traction driving power by MG2, whereas the remaining electric power is charged to power storage device 110 (FIG. 1).

However, since the chargeable amount of electric power is restricted to prevent overcharging at power storage device 110, there may be the case where the electric power generated at MG1 cannot be accepted if the SOC of power storage device 110 is sufficiently high. In that case, the optimum ignition timing at the startup of engine 160, even if set, may adversely becomes the cause of degradation and/or damage of power storage device 110 due to overcharging thereof.

According to a modification of the embodiment, the engine ignition timing control having the timing retarding level of engine ignition timing corrected according to the state of charge of the power storage device is implemented when engine revolution speed control by the motor generator is executed.

Figure 7:
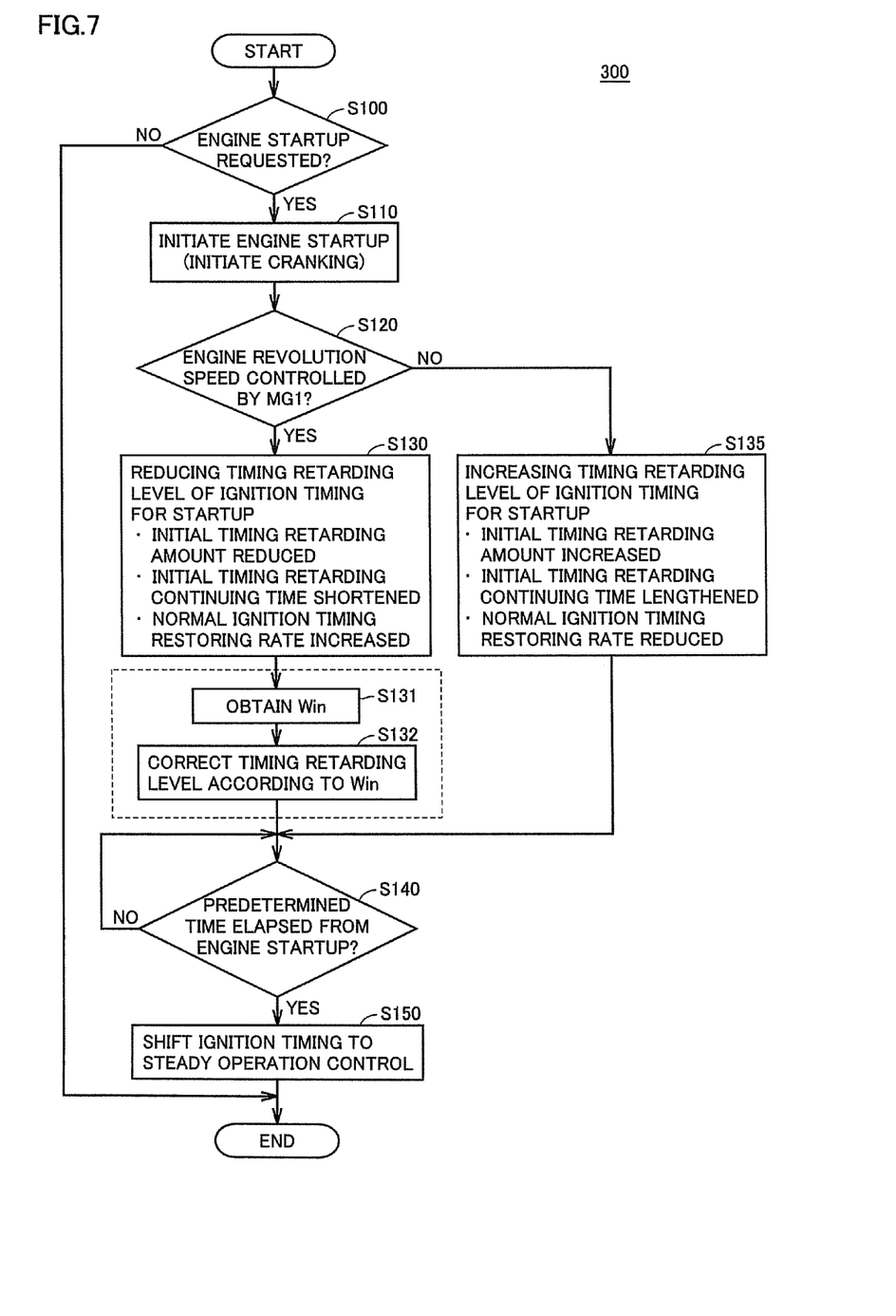
FIG. 7 is a flowchart to describe in detail an engine ignition timing control process taking into consideration the state of charge of the power storage device, executed at an ECU according to a modification of the present embodiment.

FIG. 7 is a flowchart to describe in detail the engine ignition timing control process taking into consideration the state of charge of the power storage device, executed by an ECU according to a modification of the present embodiment. FIG. 7 corresponds to the flowchart of FIG. 6, having steps S131 and S132 added. According to the flowchart of FIG. 7, description of steps duplicating those in FIG. 6 will not be repeated.

Referring to FIGS. 1 and 7, when startup of engine 160 is requested (YES at S100), and revolution speed control is executed by MG1 at S120 (YES at S120), ECU 300 reduces the timing retarding level of the ignition timing at S130, likewise with FIG. 6.

Figure 8:
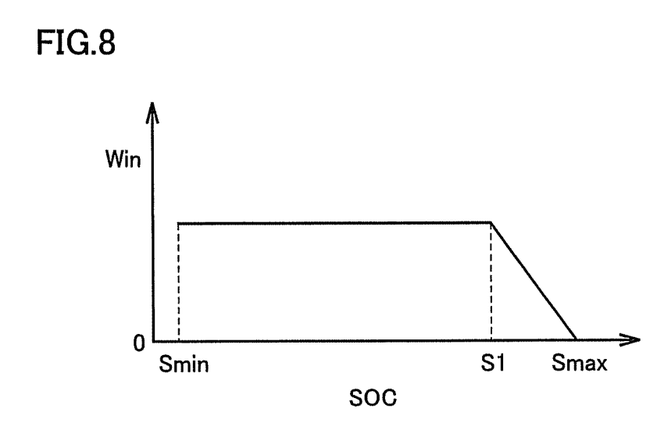
FIG. 8 represents an example of the relationship between the SOC of the power storage device and upper limit Win of the charging electric power.

Then, control proceeds to S131 where ECU 300 obtains upper limit Win of the charging electric power based on the SOC of power storage device 110. Charging electric power upper limit Win and SOC have the relationship shown in FIG. 8, for example. Charging electric power upper limit Win is set substantially constant until SOC attains a threshold value S1. When SOC exceeds threshold value S1, charging electric power upper limit Win is set to become lower as SOC increases. Then, charging electric power upper limit Win is set at zero when SOC is Smax that represents a fully charged state.

At S132, ECU 300 corrects the timing retarding level for the ignition timing such that the electric power generated by MG1 does not exceed charging electric power upper limit Win based on the obtained charging electric power upper limit Win. In other words, the timing retarding level is set to become higher as charging electric power upper limit Win becomes smaller. Then, ECU 300 starts engine 160 according to the corrected ignition timing.

By such control according to the processing set forth above, the engine of a hybrid vehicle can be started at an appropriate ignition timing depending on whether engine revolution speed control by a motor generator is executed or not while preventing overcharging of the power storage device at engine startup.

It should be understood that the embodiments disclosed herein are illustrative and non-restrictive in every respect. The scope of the present invention is defined by the terms of the claims, rather than the description set forth above, and is intended to include any modifications within the scope and meaning equivalent to the terms of the claims.

REFERENCE SIGNS LIST 100 vehicle; 110 power storage device; 115 SMR; 120 PCU; 121 converter; 122, 123 inverter; 130, 135 motor generator; 140 power transmission gear; 150 driving wheel; 160 engine; 170, 175 degree of rotation sensor; 300 ECU; C1, C2 capacitor; PL1, PL2, NL1 power line.

The invention claimed is:

1. A hybrid vehicle comprising:
an engine,
a rotating electric machine configured to control a revolution speed of the engine, and
a control device configured to control ignition timing for startup of the engine,
wherein
the control device modifies the ignition timing for startup of the engine depending on whether or not the revolution speed of the engine is controlled by the rotating electric machine,
the control device continues to set for a predetermined time, for startup of the engine, the ignition timing of the engine at a predetermined timing retarding amount, and then restores the ignition timing to a timing advancing direction at a predetermined restoring rate to the ignition timing of a steady operation of the engine,
the control device modifies the predetermined time depending on whether or not the revolution speed of the engine is controlled by the rotating electric machine, and
a case where the revolution speed of the engine is controlled by the rotating electric machine corresponds to a state where load is applied to the engine from the rotating electric machine, such that the revolution speed of the engine is maintained at a predetermined revolution speed by torque of the rotating electric machine, and a case where the revolution speed of the engine is not controlled by the rotating electric machine corresponds to a state where load is not applied to the engine from the rotating electric machine, and the revolution speed of the engine is not maintained at the predetermined revolution speed by torque of the rotating electric machine.

2. The hybrid vehicle according to claim 1, wherein the control device sets, in a case where the revolution speed of the engine is not controlled by the rotating electric machine, the predetermined time longer as compared to the case where the revolution speed of the engine is controlled by the rotating electric machine.

3. The hybrid vehicle according to claim 2, wherein the control device restores, in the case where the revolution speed of the engine is not controlled by the rotating electric machine, the ignition timing more slowly to the ignition timing of the steady operation by setting the predetermined restoring rate lower, in addition to setting the predetermined time longer.

4. The hybrid vehicle according to claim 1, wherein the control device sets, in a case where the revolution speed of the engine is not controlled by the rotating electric machine, the ignition timing for startup of the engine at a further timing retarding side as compared to the case where the revolution speed of the engine is controlled by the rotating electric machine.

5. The hybrid vehicle according to claim 1, further comprising:
a power storage device, and
another rotating electric machine generating traction driving power using electric power from the power storage device.

6. The hybrid vehicle comprising:
an engine,
a rotating electric machine configured to control a revolution speed of the engine, and
a control device configured to control ignition timing for startup of the engine,
wherein
the control device modifies the ignition timing for startup of the engine depending on whether or not the revolution speed of the engine is controlled by the rotating electric machine,
the control device continues to set for a predetermined time, for startup of the engine, the ignition timing of the engine at a predetermined timing retarding amount, and then restores the ignition timing in a timing advancing direction at a predetermined restoring rate to the ignition timing of a steady operation of the engine, the control device modifies the predetermined restoring rate depending on whether or not the revolution speed of the engine is controlled by the rotating electric machine, and a case where the revolution speed of the engine is controlled by the rotating electric machine corresponds to a state where load is applied to the engine from the rotating electric machine, such that the revolution speed of the engine is maintained at a predetermined revolution speed by torque of the rotating electric machine, and a case where the revolution speed of the engine is not controlled by the rotating electric machine corresponds to a state where load is not applied to the engine from the rotating electric machine, and the revolution speed of the engine is not maintained at the predetermined revolution speed by torque or the rotating electric machine.

7. The hybrid vehicle according to claim 6, wherein the control device restores, in a case where the revolution speed of the engine is not controlled by the rotating electric machine, the ignition timing more slowly to the ignition timing of a steady operation by setting the predetermined restoring rate low, as compared to the case where the revolution speed of the engine is controlled by the rotating electric machine.

8. The hybrid vehicle according to claim 6, wherein the control device sets, in a case where the revolution speed of the engine is not controlled by the rotating electric machine, the ignition timing for startup of the engine at a further timing retarding side as compared to the case where the revolution speed of the engine is controlled by the rotating electric machine.

9. The hybrid vehicle according to claim 6, further comprising:
a power storage device, and
another rotating electric machine generating traction driving power using electric power from the power storage device.

10. A hybrid vehicle comprising:
an engine,
a rotating electric machine configured to control a revolution speed of the engine,
a power storage device configured to be charged by electric power generated by the rotating electric machine, and
a control device configured to control ignition timing for startup of the engine,
wherein
the control device modifies the ignition timing for startup of the engine depending on whether or not the revolution speed of the engine is controlled by the rotating electric machine,
the rotating electric machine generates power by an operation of the engine in a case where the revolution speed of the engine is controlled by the rotating electric machine,
the control device modifies, in the case where the revolution speed of the engine is controlled by the rotating electric machine, a timing retarding level of ignition timing for startup of the engine based on a state of charge of the power storage device, and
a case where the revolution speed of the engine is controlled by the rotating electric machine corresponds to a state where load is applied to the engine from the rotating electric machine, such that the revolution speed of the engine is maintained at a predetermined revolution speed by torque of the rotating electric machine, and a case where the revolution speed of the engine is not controlled by the rotating electric machine corresponds to a state where load is not applied to the engine from the rotating electric machine, and the revolution speed of the engine is not maintained at the predetermined revolution speed by torque of the rotating electric machine.

11. The hybrid vehicle according to claim 10, wherein
a charging electric power upper limit to the power storage device is determined according to an amount of electric power remaining in the power storage device,
the control device sets the timing retarding level of ignition timing for startup of the engine greater as the charging electric power upper limit to the power storage device becomes smaller.

12. The hybrid vehicle according to claim 10, wherein the control device sets, in a case where the revolution speed of the engine is not controlled by the rotating electric machine, the ignition timing for startup of the engine at a further timing retarding side as compared to the case where the revolution speed of the engine is controlled by the rotating electric machine.

13. The hybrid vehicle according to claim 10, further comprising:
a power storage device, and
another rotating electric machine generating traction driving power using electric power from the power storage device.

14. A control method of a hybrid vehicle including an engine and a rotating electric machine configured to control a revolution speed of the engine, the control method comprising the steps of:
determining whether or not the revolution speed of the engine is controlled by the rotating electric machine;
modifying ignition timing for startup of the engine according to a determination result by the determining step;
continuing to set for a predetermined time, for startup of the engine, the ignition timing of the engine at a predetermined timing retarding amount, and then restoring the ignition timing to a timing advancing direction at a predetermined restoring rate to the ignition timing of a steady operation of the engine; and
modifying the predetermined time depending on whether or not the revolution speed of the engine is controlled by the rotating electric machine, and
a case where the revolution speed of the engine is controlled by the rotating electric machine corresponds to a state where load is applied to the engine from the rotating electric machine, such that the revolution speed of the engine is maintained at a predetermined revolution speed by torque of the rotating electric machine, and a case where the revolution speed of the engine is not controlled by the rotating electric machine corresponds to a state where load is not applied to the engine from the rotating electric machine, and the revolution speed of the engine is not maintained at the predetermined revolution speed by torque of the rotating electric machine.

15. A control method of a hybrid vehicle including an engine and a rotating electric machine configured to control a revolution speed of the engine, the control method comprising the steps of:
determining whether or not the revolution speed of the engine is controlled by the rotating electric machine;
modifying ignition timing for startup of the engine according to a determination result by the determining step;
continuing to set for a predetermined time, for startup of the engine, the ignition timing of the engine at a predetermined timing retarding amount, and then restoring the ignition timing in a timing advancing direction at a predetermined restoring rate to the ignition timing of a steady operation of the engine; and modifying the predetermined restoring rate depending on whether or not the revolution speed of the engine is controlled by the rotating electric machine, and a case where the revolution speed of the engine is controlled by the rotating electric machine corresponds to a state where load is applied to the engine from the rotating electric machine, such that the revolution speed of the engine is maintained at a predetermined revolution speed by torque of the rotating electric machine, and a case where the revolution speed of the engine is not controlled by the rotating electric machine corresponds to a state where load is not applied to the engine from the rotating electric machine, and the revolution speed of the engine is not maintained at the predetermined revolution speed by torque of the rotating electric machine.

16. A control method of a hybrid vehicle including an engine and a rotating electric machine configured to control a revolution speed of the engine, the control method comprising the steps of:

determining whether or not the revolution speed of the engine is controlled by the rotating electric machine;

modifying ignition timing for startup of the engine according to a determination result by the determining step;

generating power using the rotating electric machine by an operation of the engine in a case where the revolution speed of the engine is controlled by the rotating electric machine; and modifying, in the case where the revolution speed of the engine is controlled by the rotating electric machine, a timing retarding level of ignition timing for startup of the engine based on a state of charge of the power storage device, and a case where the revolution speed of the engine is controlled by the rotating electric machine corresponds to a state where load is applied to the engine from the rotating electric machine, such that the revolution speed of the engine is maintained at a predetermined revolution speed by torque of the rotating electric machine, and a case where the revolution speed of the engine is not controlled by the rotating electric machine corresponds to a state where load is not applied to the engine from the rotating electric machine, and the revolution speed of the engine is not maintained at the predetermined revolution speed by torque of the rotating electric machine.

* * * * *